(12) United States Patent
Linde et al.

(10) Patent No.: US 10,611,494 B2
(45) Date of Patent: Apr. 7, 2020

(54) STRUCTURAL COMPOSITE COMPONENT AND METHOD FOR CONFIGURING A STRUCTURAL COMPOSITE COMPONENT

(71) Applicant: Airbus Operations GmbH, Hamburg (DE)

(72) Inventors: Peter Linde, Hamburg (DE); Josefina Menendez-Alberquilla, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 400 days.

(21) Appl. No.: 15/609,097

(22) Filed: May 31, 2017

(65) Prior Publication Data

US 2017/0349297 A1 Dec. 7, 2017

(30) Foreign Application Priority Data

Jun. 1, 2016 (EP) .................................. 16172441

(51) Int. Cl.

| | |
|---|---|
| *B64D 45/02* | (2006.01) |
| *B32B 15/14* | (2006.01) |
| *H01M 10/058* | (2010.01) |
| *B64C 3/26* | (2006.01) |
| *H01M 4/134* | (2010.01) |
| *H01M 4/36* | (2006.01) |
| *H01M 10/052* | (2010.01) |
| *H01M 4/38* | (2006.01) |

(Continued)

(52) U.S. Cl.

CPC .............. *B64D 45/02* (2013.01); *B32B 15/14* (2013.01); *B64C 1/12* (2013.01); *B64C 3/26* (2013.01); *H01M 2/0257* (2013.01); *H01M 2/0267* (2013.01); *H01M 2/0287* (2013.01); *H01M 2/0295* (2013.01); *H01M 4/133* (2013.01); *H01M 4/134* (2013.01); *H01M 4/366* (2013.01); *H01M 4/38* (2013.01); *H01M 4/583* (2013.01); *H01M 10/0413* (2013.01); *H01M 10/052* (2013.01); *H01M 10/058* (2013.01); *H02G 13/80* (2013.01); *B64C 2001/0072* (2013.01); *H01M 2002/0205* (2013.01); *H01M 2004/025* (2013.01); *H01M 2220/20* (2013.01); *H02J 7/00* (2013.01); *Y02E 60/122* (2013.01); *Y02P 70/54* (2015.11)

(58) Field of Classification Search

CPC ................................ B64D 45/02; B32B 15/14

See application file for complete search history.

(56) References Cited

U.S. PATENT DOCUMENTS 4,448,838 A * 5/1984 McClenahan ........... B29C 70/08
428/408
2002/0146620 A1 10/2002 Connell
(Continued)

FOREIGN PATENT DOCUMENTS

DE 102006046002 4/2008

OTHER PUBLICATIONS

European Search Report, dated Oct. 14, 2016, priority document.

*Primary Examiner* — Scott Bauer

(74) *Attorney, Agent, or Firm* — Greer, Burns & Crain, Ltd.

(57) ABSTRACT

A structural composite component, in particular for an aircraft or spacecraft, has a lightning strike protection layer, and a composite battery comprising a cathode layer, wherein the lighting strike protection layer is formed integrated with the cathode layer.

25 Claims, 5 Drawing Sheets

(51) Int. Cl.
*H01M 2/02* (2006.01)
*H01M 10/04* (2006.01)
*H01M 4/133* (2010.01)
*H01M 4/583* (2010.01)
*B64C 1/12* (2006.01)
*H02G 13/00* (2006.01)
*H01M 4/02* (2006.01)
*B64C 1/00* (2006.01)
*H02J 7/00* (2006.01)

(56) References Cited

U.S. PATENT DOCUMENTS

| | | | |
|---|---|---|---|
| 2012/0308887 A1* | 12/2012 | Hucker | H01M 2/1606 |
| | | | 429/211 |
| 2013/0059173 A1 | 3/2013 | Hucker et al. | |
| 2016/0031569 A1 | 2/2016 | Karch et al. | |
| 2016/0052638 A1* | 2/2016 | Kamihara | B64C 3/34 |
| | | | 220/562 |
| 2017/0217604 A1* | 8/2017 | Birchak | B64D 13/04 |

\* cited by examiner

STRUCTURAL COMPOSITE COMPONENT AND METHOD FOR CONFIGURING A STRUCTURAL COMPOSITE COMPONENT

CROSS-REFERENCES TO RELATED APPLICATIONS

This application claims the benefit of the European patent application No. 16172441.4 filed on Jun. 1, 2016, the entire disclosures of which are incorporated herein by way of reference.

FIELD OF THE INVENTION

The present invention pertains to a structural composite component, in particular for an aircraft or spacecraft, to a method for configuring a structural composite component of this type and to an aircraft or spacecraft comprising such a structural composite component.

Although applicable to any kind of structure, for example various kinds of vehicles, in particular aircraft, spacecraft or the like, the present invention and the problem on which it is based, will be explained in greater detail with reference to the skin of commercial aircraft.

BACKGROUND OF THE INVENTION

Modern skins of aircraft are often constructed with composite material. For protection against lightning strike and/or magnetic pulse, usually an additional highly conductive layer, the so called lightning strike protection (LSP), is incorporated into the skin.

The document DE 10 2006 046 002 A1 describes a multilayer system for lightning strike protection comprising a paint layer including polarized particles.

Furthermore, in recent years, attempts have been made to develop battery function integrated in a composite structure.

SUMMARY OF THE INVENTION

It is an idea of the present invention to provide for an improved structural composite component. Furthermore, it is another idea of the present invention to provide for a method for configuring such an improved structural composite component.

According to one aspect, therefore, the present invention provides a structural composite component, in particular for an aircraft or spacecraft, comprising: a lightning strike protection layer; and a composite battery comprising a cathode layer, wherein the lighting strike protection layer is formed integrated with the cathode layer.

According to another aspect, the present invention provides a method for configuring a structural composite component, in particular for an aircraft or spacecraft, the method comprising: Stacking an anode layer, a separation layer and a lightning strike protection layer; and contacting the anode layer and the lightning strike protection layer to form a composite battery, wherein the lightning strike protection layer is contacted as cathode layer.

According to another aspect, the present invention provides an aircraft or spacecraft comprising a structural composite component, in particular an outer skin, according to the invention and/or formed by a method according to the invention.

One idea of the present invention is to provide a structural composite component with integrated composite battery and lightning strike protection, wherein a lightning strike protection layer and a cathode layer of the composite battery are formed integrally with each other. This is achieved in particular in that the lightning strike protection layer is used as the cathode layer of the composite battery.

This means, in contrast to a conventional composite battery, the stack of layers is changed in that the cathode forms an uppermost or outermost layer.

Furthermore, the lightning strike protection layer, in contrast to a conventional LSP, is contacted as the cathode of the composite battery. In particular, the lightning strike protection layer is formed and stacked correspondingly.

In this way, a conventional cathode layer is omitted. Therefore, weight of the composite component can be reduced, in particular in comparison to a component including separate composite battery and lightning strike protection, especially having both, a separate lightning strike protection layer and cathode layer.

In addition to the weight, also the laminate thickness can be reduced. Furthermore, since the conventional cathode layer is omitted, less material is necessary. Therefore, cost for material and for manufacturing labor can be reduced.

The method for configuring and/or manufacturing the structural composite component comprises stacking an anode, a separation layer and a lightning strike protection layer and further contacting the anode and the lightning strike protection layer to form a composite battery. In particular, the separation layer is arranged between the anode layer and the lightning strike protection layer. Furthermore, contacts are provided, wherein a positive contact is provided for the lightning strike protection layer and a negative contact is provided for the anode layer. In particular, the lightning strike protection layer thereby is contacted and configured, for example formed and stacked accordingly, to function as cathode layer. Thereby, the function of LSP is kept, in particular, fully kept.

The aircraft or spacecraft of the present invention can comprise such a structural composite component formed as an outer skin. In this way, at the same time a large surface serving as a composite battery and effective lightning strike protection are provided integrated into the outer skin at minimum weight.

The lightning strike protection layer can comprise metal, for example conductive metal, such as, for example, copper.

According to an embodiment, the structural composite component is configured as a painted multi-layer skin portion. In particular, the painted multi-layer skin portion is configured for forming an outer skin of an aircraft or spacecraft, e.g., a fuselage skin portion. In this way, both the composite battery and lightning strike protection function are integrated into a skin, for example the skin of an aircraft or spacecraft.

According to an embodiment, the lighting strike protection layer formed integrated with the cathode layer is arranged at an outermost layer of the multi-layer skin portion. In particular, the lighting strike protection layer configured as the cathode layer is arranged directly under the paint. This means the stack of the composite battery is adapted in that the cathode layer is arranged as the outermost layer. In this way, integration of the cathode layer and the lightning strike protection layer is feasible without any reduction of lightning strike protection function.

According to an embodiment, the lighting strike protection layer is configured as the cathode layer. In particular, the lighting strike protection layer configured as the cathode layer is formed as a single layer. This means, the cathode and the lightning strike protection layer are not just merged with each other, but the lightning strike protection layer is used in an extra function as a cathode, for example formed as one single common layer. Accordingly, this layer is designed, for example in terms of thickness, surface, electric potential and/or conductivity, to fulfill both functions of a cathode for the composite battery and of providing lightning strike protection for the structural composite component.

According to another embodiment, the lighting strike protection layer configured as the cathode layer is formed as a metallic mesh, in particular as a copper mesh. In this way, high conductivity of the lightning strike protection layer is provided. As an alternative to copper, other highly conductive metal, such as, e.g., aluminum, may be used. The metallic mesh may be formed, for example, as an expanded foil.

According to another embodiment, the composite battery further comprises an anode layer and a separation layer. the separation layer is arranged between the anode layer and the lighting strike protection layer, which is configured as the cathode layer. The anode layer and the separation layer are integrated into the structural composite component. In particular, the anode layer and the separation layer are integrated in a stack of layers of the structural composite component. In this way, the composite battery can be formed fully integrated with the structural composite component.

According to an embodiment, the capacity of the composite battery is adapted to the thickness of the lightning strike protection layer. Alternatively or in addition, the capacity of the composite battery may be adapted to the surface of the lightning strike protection layer. This means the lightning strike protection layer forms a design constraint, the rest of the composite battery, in particular the thickness and/or surface of the anode, is adapted to. In this way, the lightning strike protective function is ensured. For example, according to an embodiment, the anode comprises a plurality of fiber layers, in particular carbon fiber layers or plies, wherein the number of contacted fiber layers is adapted to the thickness and/or surface of the lightning strike protection layer in terms of capacity of the composite battery.

According to another embodiment, the thickness of the lightning strike protection layer is enhanced to be adapted to the capacity of the composite battery. Alternatively or in addition, the surface of the lightning strike protection layer may be enhanced for adaption. This means the minimum thickness and or surface of the lightning strike protection layer necessary for providing the lightning strike protective function forms a minimum constraint in design. However, the thickness and/or surface of the lightning strike protection layer may be enhanced in order to fit to the other components, in particular the anode, of the composite battery. In particular, the thickness and/or surface is enhanced if the desired capacity of the composite battery is higher than the capacity corresponding to the minimum thickness and/or surface of the lightning strike protection layer. For example, the anode comprises a plurality of fiber layers, in particular carbon fiber layers or plies. In this case, thickness and/or surface of the lightning strike protection layer is enhanced, in particular to more than a usual thickness of 0.02 mm to 0.15 mm, to be adapted to the contacted number of fiber layers in terms of capacity of the composite battery.

According to an embodiment, the thickness of the lightning strike protection layer may be enhanced by providing a single lightning strike protection layer of enhanced thickness. In this way, handling and manufacturing is easy.

According to another embodiment, the thickness of the lightning strike protection layer may be enhanced by providing a multilayer lightning strike protection layer, for example a lightning strike protection double layer. In this way, changing the thickness is feasible in a flexible way.

According to an embodiment of the method for configuring the structural composite component, the stack is formed as a painted multi-layer skin portion and the lightning strike protection layer configured and contacted as cathode is positioned as an outermost layer thereof. In particular, the lightning strike protection layer configured and contacted as cathode is arranged directly under the paint. Accordingly, the stack of the composite battery is adapted in that the cathode layer is arranged as an outermost layer. In this way, integration of the cathode layer and the lightning strike protection layer is feasible without any reduction of lightning strike protection function compared to conventional LSP.

According to another embodiment of the method, stacking the lightning strike protection layer comprises stacking a single metallic mesh. Furthermore, contacting the lightning strike protection layer comprises contacting the single metallic mesh. This single metallic mesh is designed to fulfill both function of a cathode for the composite battery and of lightning protection for the structural composite component. In particular, the mesh may be formed as a copper mesh. In this way, high conductivity of the lightning strike protection layer is provided. As an alternative to copper, another highly conductive metal, such as, e.g., aluminum, may be used. The metallic mesh may be formed, for example, as an expanded grid or expanded foil.

According to another embodiment of the method, stacking the anode layer comprises stacking a plurality of contacted fiber layers, in particular carbon fiber layers or plies. In this case, the number of contacted fiber layers is adapted to the thickness and/or surface of the lightning strike protection layer. Alternatively, the thickness and/or surface of the lightning strike protection layer can be enhanced to be adapted to the number of contacted fiber layers, in particular, in case the number of contacted fiber layers is high. In this way, the composite battery this optimized and full lightning strike protection is kept.

BRIEF DESCRIPTION OF THE DRAWINGS

The invention will be explained in greater detail with reference to exemplary embodiments depicted in the drawings as appended.

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily in scale relative to each other. In the figures, like reference numerals denote like or functionally like components, unless indicated otherwise.

Although specific embodiments are illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

DETAILED DESCRIPTION OF THE PREFERRED EMBODIMENTS

Figure 1A:
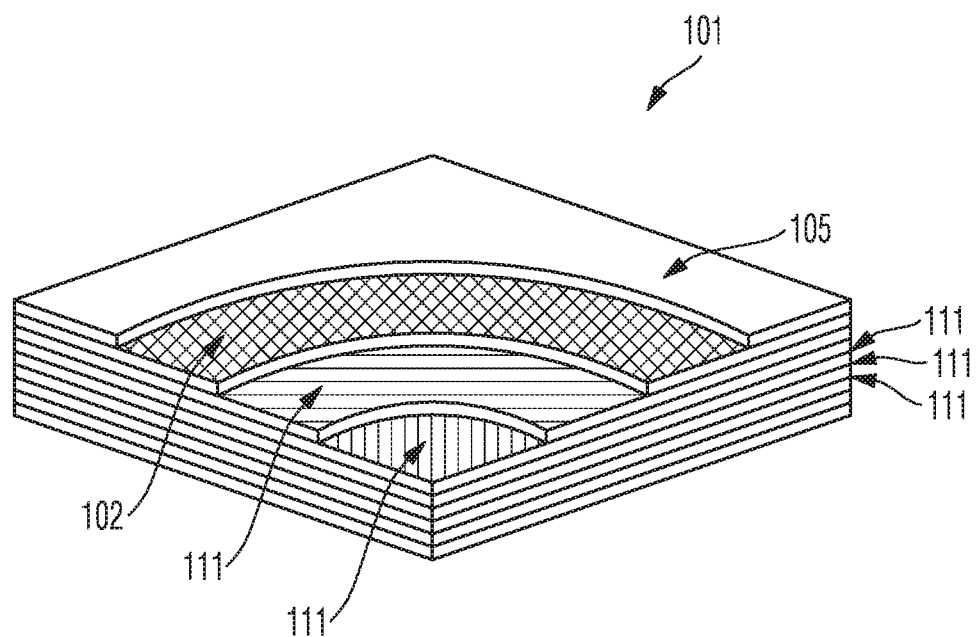
FIG. 1A schematically illustrates a sectional view of a typical composite laminate for an aircraft skin.

FIG. 1A schematically illustrates a sectional view of a typical composite laminate for outer skin of an aircraft, for example.

In FIG. 1, reference sign 101 denotes a laminate comprising an outside paint 105 functioning as a surface protection and cosmetic layer. Under the paint 105, a layer for lightning strike protection (LSP) 102 is provided comprising a metal mesh. The LSP 102 is followed by several plies of carbon fiber reinforced polymer (CFRP) 111 with different orientations providing structural strength. For example, a first CFRP ply 111 is oriented +45° and a second CFRP ply 111 is oriented −45°. Further CFRP plies 111 may be oriented 90° and 0°.

Figure 1B:
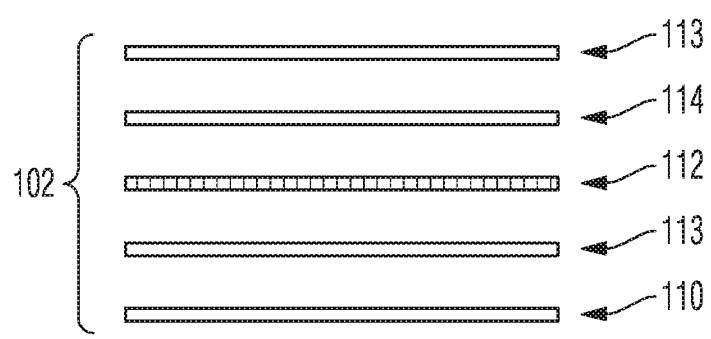
FIG. 1B shows an exploded view of typical layers of an LSP.

FIG. 1B shows an exploded view of typical layers of an LSP 102.

The LSP 102 itself comprises several layers. An uppermost layer may be configured as resin film 113 functioning as a tool surface, on which the paint 105 may be applied. The resin film 113 comprises a mat/veil carrier 114, which is placed on a metal mesh 112, e.g., configured as expanded copper foil (ECF). The metal mesh 112 has a typical thickness between 0.02 mm and 0.15 mm and provides for electric conductivity.

Underneath the metal mesh 112, another resin film 113 is placed. The bottom layer of the LSP is formed by a paper 110 which serves for placement of the LSP in the panel lamination.

Figure 2:
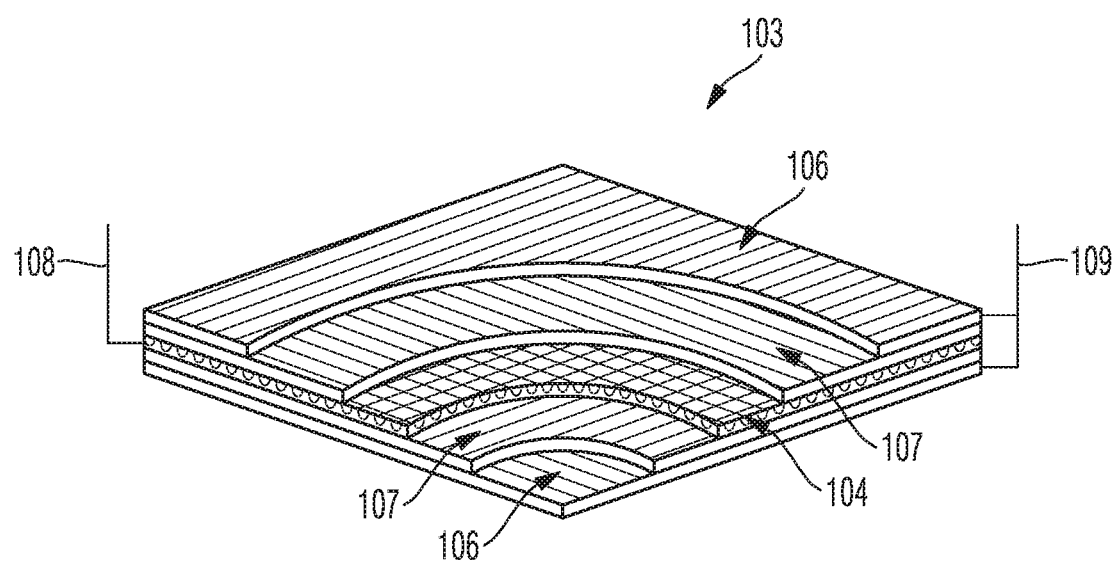
FIG. 2 schematically illustrates a sectional view of a basic build-up of a composite battery cell.

FIG. 2 schematically illustrates a sectional view of a basic build-up of a composite battery cell 103.

The composite battery cell 103 is formed as a stack of layers comprising a cathode layer 104, which is, for example, configured as a ferritic oxide mesh or as a copper mesh. The cathode layer 104 is arranged in the middle of the stack sandwiched between two separator layers 107 and contacted with a positive contact 108. The separator layers 107 are configured for separating negative and positive parts of the composite battery 103. However, they are configured ion-transmissive, meaning they let charged ion particles transfer through. For example, the separator layers may comprise a glass fiber mesh or glass fiber reinforced plastic.

On the top and on the bottom of the stack, respectively, an anode layer 106 is arranged and contacted with a negative contact 109. The anode layers 106 comprise, for example, unidirectional tape or fabric of carbon fiber plies embedded in a solid polymer resin. The polymer resin serves as electrolyte letting ions move, while the carbon fibers function as an anode.

Figure 3:
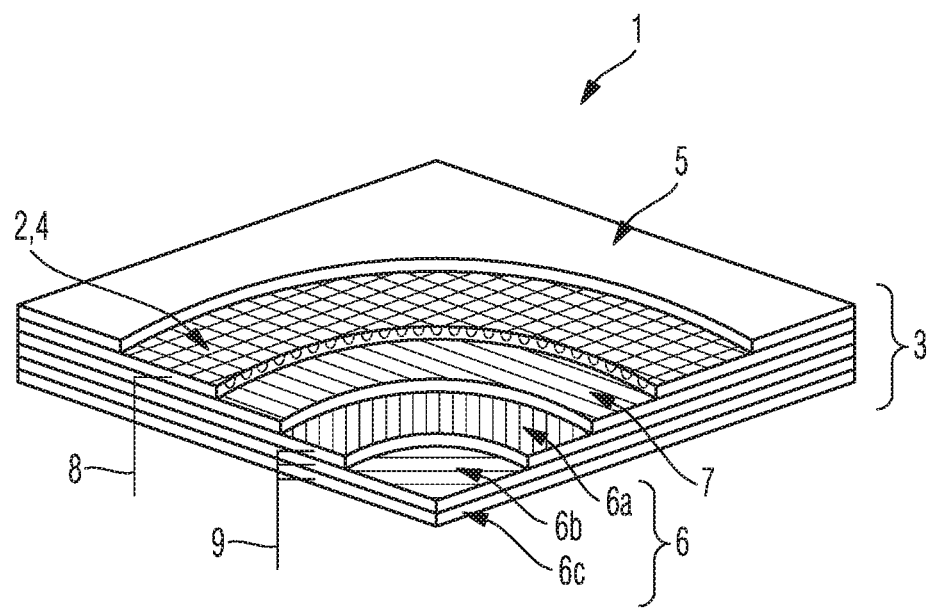
FIG. 3 schematically illustrates a sectional view of a structural composite component.

FIG. 3 schematically illustrates a sectional view of a structural composite component 1.

The structural composite component 1 comprises a metallic lightning strike protection layer 2 and a composite battery 3.

The composite battery 3 comprises an anode layer 6, a separation layer 7 and a cathode layer 4, which are integrated in the stack of the structural composite component 1.

The lightning strike protection layer 2 is configured as the cathode layer 4. Accordingly, the lightning strike protection layer 2 configured as the cathode layer 4 is contacted by a positive contact 8 of the composite battery 3.

Furthermore, the anode layer 6 is contacted with a negative contact 9 of the composite battery 3.

The lightning strike protection layer 2 configured as the cathode 4 is covered by a paint 5 functioning as a surface protection and cosmetic layer. For example, the paint may be configured with logos or the like.

The anode layer 6 is formed by a plurality of fiber layers 6a, 6b, 6c. In the embodiment depicted in FIG. 3, for example, three contacted fiber layers 6a, 6b, 6c are provided to form the anode layer 6. However, it will be understood that any suitable number of contacted fiber layers 6a, 6b, . . . , 6n may be provided to form the anode layer 6. In particular, the capacity of the composite battery 3 can be adapted to the thickness or surface of the lightning strike protection layer 2 by variation of the number of the contacted fiber layers 6a, 6b, . . . , 6n.

Furthermore, additional fiber layers (not shown) which are not contacted may be provided in the stack for structural purposes.

The structural composite component 1 forms a skin portion, in particular for an aircraft or spacecraft 10. Thereby, the lightning strike protection layer 2 configured as the cathode layer 4 forms the outermost layer of the skin portion directly under the paint 5.

In the embodiment shown, the lightning strike protection layer 2 configured as the cathode layer 4 is formed as a single layer made of a metallic mesh. The metallic mesh can be configured as a copper mesh. For example, a copper mesh product named "Microgrid® material" by Dexmet Corporation, Wallingford, Conn., USA, may be used. The thickness of the copper mesh is chosen at least according to requirements for the LSP and may be chosen bigger, if desired for the cathode function.

Figure 4:
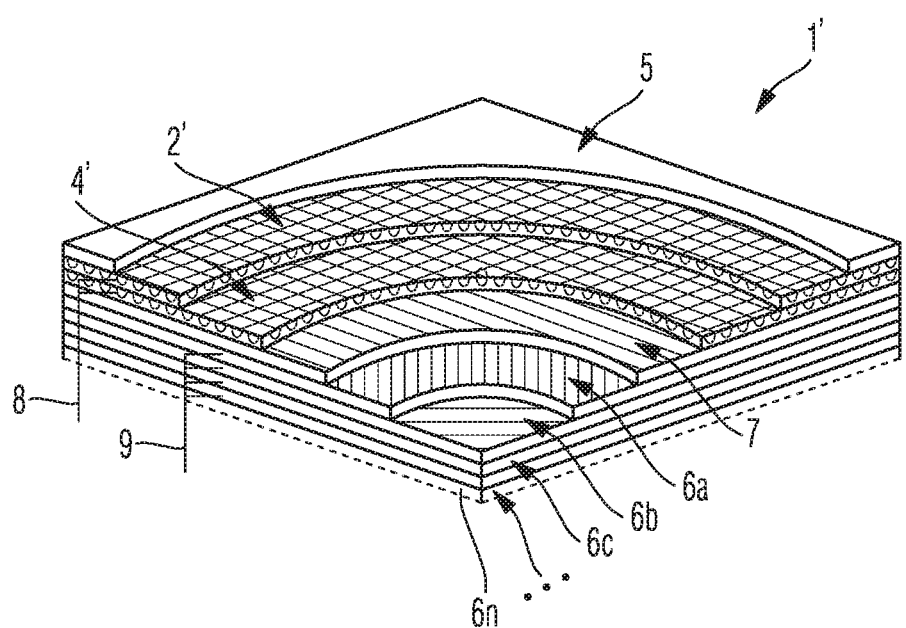
FIG. 4 schematically illustrates a sectional view of a structural composite component according to another embodiment.

FIG. 4 schematically illustrates a sectional view of a structural composite component 1' according to another embodiment.

The composite component 1' differs from the composite component 1 of FIG. 3 in that the anode layer comprises a plurality of contacted fiber layers 6a, 6b, 6c, 6d, . . . , 6n. In this way, composite battery is configured with a higher capacity.

Accordingly, the thickness of the lightning strike protection layer 2' configured as the cathode 4' is enhanced. In the embodiment shown, as an example only, a lightning strike protection layer 2' of enhanced thickness is formed as a double layer of two metal meshes. Therefore, two directly contacted metal meshes are stacked directly upon each other to form the lightning strike protection layer 2' configured as the cathode layer 4' with enhanced thickness.

It will be understood that according to another embodiment, a single metal mesh with enhanced thickness may be used instead of a double layer to form the lightning strike protection layer 2'.

As explained with regard to FIG. 3, the metal meshes can be configured configured as copper meshes.

Figure 5:
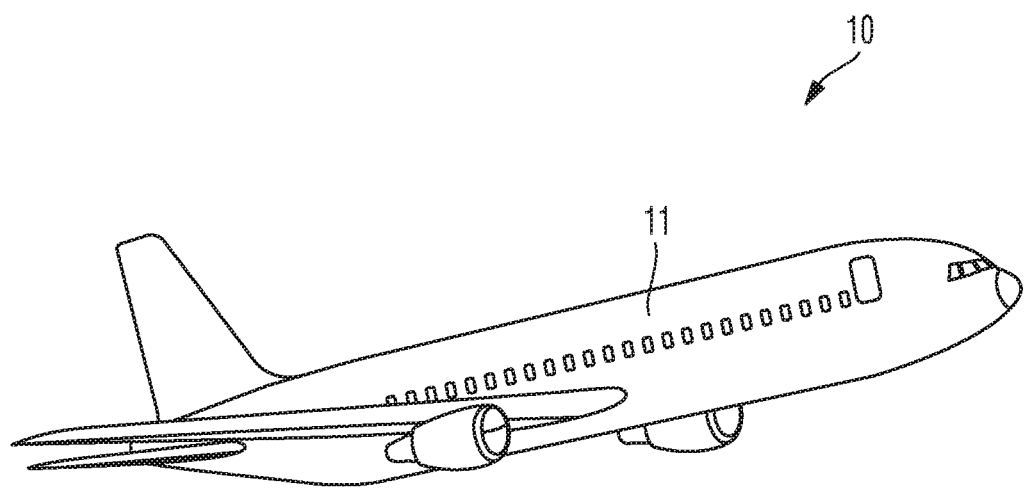
FIG. 5 illustrates an aircraft or spacecraft.

FIG. 5 schematically illustrates an aircraft or spacecraft 10.

The aircraft or spacecraft 10 is configured as a commercial aircraft and comprises a fuselage with an outer skin 11. The outer skin 11 is formed as a structural composite component 1 comprising a metallic lightning strike protection layer 2 and a composite battery 3 wherein the metallic lightning strike protection layer 2 is configured as cathode 4 of the composite battery 3, as described with reference to FIG. 3 or 4.

Although specific embodiments of the invention are illustrated and described herein, it will be appreciated by those of ordinary skill in the art that a variety of alternate and/or equivalent implementations exist.

It will be appreciated that the exemplary embodiments are examples only and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A structural composite component comprising:
    a lightning strike protection layer; and
    a composite battery comprising a cathode layer,
    wherein the lighting strike protection layer is formed as a metallic mesh and is integrated with the cathode layer.

2. The structural composite component of claim 1, wherein the structural composite component is configured as a painted multi-layer skin portion.

3. The structural composite component of claim 2, wherein the lighting strike protection layer formed integrated with the cathode layer is arranged as an outermost layer of the multi-layer skin portion.

4. The structural composite component of claim 3, wherein the lighting strike protection layer formed integrated with the cathode layer is arranged directly under the paint.

5. The structural composite component of claim 1, wherein the lighting strike protection layer is configured as the cathode layer.

6. The structural composite component of claim 1, wherein the lighting strike protection layer is configured such that it forms a single layer.

7. The structural composite component of claim 5, wherein the lighting strike protection layer configured as the cathode layer is formed as a copper mesh.

8. The structural composite component of claim 5, wherein the cathode layer comprises a composite battery, which further comprises an anode layer and a separation layer arranged between the anode layer and the lighting strike protection layer configured as the cathode layer, and
    wherein the anode layer and the separation layer are integrated into the structural composite component.

9. The structural composite component of claim 8, wherein the capacity of the composite battery is adapted to at least one of the thickness and the surface of the lightning strike protection layer.

10. The structural composite component of claim 9, wherein the anode layer comprises a plurality of fiber layers wherein the number of contacted fiber layers is adapted to at least one of the thickness and the surface of the lightning strike protection layer in terms of capacity of the composite battery.

11. The structural composite component of claim 9, wherein at least one of the thickness and the surface of the lightning strike protection layer is enhanced to be adapted to the capacity of the composite battery.

12. The structural composite component of claim 9, wherein the anode layer comprises a plurality of carbon fiber layers.

13. The structural composite component of claim 12, wherein the anode layer comprises a plurality of fiber layers, wherein at least one of the thickness and the surface of the lightning strike protection layer is enhanced to be adapted to the number of contacted fiber layers in terms of capacity of the composite battery.

14. The structural composite component of claim 8, wherein the anode layer comprises a plurality of carbon fiber layers.

15. The structural composite component of claim 11, wherein the thickness of the lightning strike protection layer is enhanced to more than 0.15 mm.

16. A method for configuring a structural composite component, the method comprising:
    stacking an anode layer, a separation layer and a lightning strike protection layer which is made of a metallic mesh; and
    contacting the anode layer and the lightning strike protection layer to form a composite battery, wherein the lightning strike protection layer is contacted as a cathode layer.

17. The method of claim 16, wherein the stack is formed as a painted multi-layer skin portion and the lightning strike protection layer contacted as the cathode layer is positioned as an outermost layer thereof.

18. The method of claim 17, wherein the lightning strike protection layer contacted as the cathode layer is positioned directly under the paint.

19. The method of claim 16, wherein stacking the lightning strike protection layer comprises stacking a single metallic mesh as the metallic mesh and wherein contacting the lightning strike protection layer comprises contacting the single metallic mesh.

20. The method of claim 16, wherein stacking the anode layer comprises stacking a plurality of contacted fiber layers, wherein the number of contacted fiber layers is adapted to at least one of the thickness and the surface of the lightning strike protection layer.

21. The method of claim 16, wherein stacking the anode layer comprises stacking a plurality of contacted fiber layers, wherein at least one of the thickness and the surface of the lightning strike protection layer contacted as the cathode layer is enhanced to be adapted to the number of contacted fiber layers.

22. The method of claim 20, wherein stacking the anode layer comprises stacking a plurality of contacted carbon fiber layers.

23. The method of claim 21, wherein stacking the anode layer comprises stacking a plurality of contacted carbon fiber layers.

24. An aircraft or spacecraft comprising a structural composite component, the structural composite component comprising
 a lightning strike protection layer; and
 a composite battery comprising a cathode layer,
  wherein the lighting strike protection layer is formed as a metallic mesh and is integrated with the cathode layer.

25. Aircraft or spacecraft comprising a structural composite component, the structural composite component formed by a method comprising:
 stacking an anode layer, a separation layer and a lightning strike protection layer which is made of a metallic mesh; and
 contacting the anode layer and the lightning strike protection layer to form a composite battery, wherein the lightning strike protection layer is contacted as cathode layer.

* * * * *